(12) United States Patent
Kazadi

(10) Patent No.: US 12,390,748 B2
(45) Date of Patent: Aug. 19, 2025

(54) LOW ENERGY LIQUID DEGASIFICATION DEVICES AND METHODS

(71) Applicant: Kazadi Enterprises Ltd., Batavia, IL (US)

(72) Inventor: Sanza T. Kazadi, Batavia, IL (US)

(73) Assignee: Kazadi Enterprises Ltd., Batavia, IL (US)

( * ) Notice: Subject to any disclaimer, the term of this patent is extended or adjusted under 35 U.S.C. 154(b) by 0 days.

(21) Appl. No.: 18/667,451

(22) Filed: May 17, 2024

(65) Prior Publication Data

US 2024/0299865 A1    Sep. 12, 2024

Related U.S. Application Data

(62) Division of application No. 17/306,471, filed on May 3, 2021, now Pat. No. 12,017,158.

(51) Int. Cl.
*B01D 19/00* (2006.01)
(52) U.S. Cl.
CPC ..... *B01D 19/0094* (2013.01); *B01D 19/0068* (2013.01)
(58) Field of Classification Search
CPC . B01D 19/00; B01D 19/0094; B01D 19/0068
See application file for complete search history.

(56) References Cited

U.S. PATENT DOCUMENTS

| | | | |
|---|---|---|---|
| 2,376,221 A * | 5/1945 | Baker | B01D 19/0078 96/197 |
| 3,229,445 A | 1/1966 | Kraft | |
| 4,571,244 A | 2/1986 | Knighton | |
| 4,986,837 A | 1/1991 | Shibata | |
| 5,279,647 A * | 1/1994 | Gatten | B01D 19/0042 96/219 |
| 5,508,975 A | 4/1996 | Walter | |
| 5,695,545 A * | 12/1997 | Cho | B01D 71/261 96/6 |
| 5,876,604 A | 3/1999 | Nemser et al. | |

(Continued)

FOREIGN PATENT DOCUMENTS

| | | |
|---|---|---|
| JP | 3442791 B2 | 9/2003 |
| KR | 10-0480868 B1 | 7/2005 |

OTHER PUBLICATIONS

Kazadi, U.S. Office Action mailed Dec. 22, 2023, directed to U.S. Appl. No. 17/306,471; 20 pages.

(Continued)

*Primary Examiner* — Youngsul Jeong
(74) *Attorney, Agent, or Firm* — Morrison & Foerster LLP

(57) ABSTRACT

Provided are degasification devices and methods of degasifying a liquid. Methods of degasifying a liquid can include filling a liquid chamber with a liquid; increasing an internal volume of the liquid chamber to generate a vacuum within the liquid chamber; applying one or more pressure waves to the liquid in the liquid chamber to accelerate the formation of a plurality of gas bubbles which rise to the surface of the liquid and release gas within the plurality of gas bubbles into a space above the liquid in the liquid chamber; and decreasing the internal volume of the liquid chamber to force the gas through a vapor outlet of the liquid chamber, wherein a degassed liquid remains in the liquid chamber.

18 Claims, 5 Drawing Sheets

(56) References Cited

U.S. PATENT DOCUMENTS 8,152,904 B2     4/2012   Slobodzian et al.
8,778,055 B2     7/2014   Taylor et al.
9,173,987 B2 *   11/2015   Meyer ............... A61M 1/15632

OTHER PUBLICATIONS

Kazadi, U.S. Office Action mailed Jul. 12, 2023, directed to U.S. Appl. No. 17/306,471; 8 pages.

* cited by examiner

LOW ENERGY LIQUID DEGASIFICATION DEVICES AND METHODS

CROSS REFERENCE TO RELATED APPLICATIONS

This application is a divisional of U.S. application Ser. No. 17/306,471, filed May 3, 2021, the entire contents of which are incorporated herein by reference.

FIELD

The present disclosure relates to low energy devices and methods for removing air from a liquid.

BACKGROUND

Many industrial processes (e.g., chemical synthesis, boiler systems, pharmaceutical manufacturing, cosmetic manufacturing, entrochemical systems) use degasification techniques to remove dissolved gases from liquids. Conventional methods of degassing a liquid can include applying heat, applying a vacuum, utilizing pressure waves to speed bubble formation, and/or creating a barrier through which gas can permeate but liquid cannot.

SUMMARY OF THE DISCLOSURE

Conventional degasification methods typically require high amounts of energy. For example, many conventional degasification methods require the application of heat and/or vacuum, which require high amounts of energy to effectively remove gas from the liquid. Thus, degasification methods requiring lower amounts of energy can increase accessibility for many industrial applications.

Accordingly, low energy degasification devices and methods for removing gas from a liquid are provided. The devices and methods described may require less energy to adequately remove gas from a liquid than conventional degasification techniques. In some embodiments, liquid degasification methods and devices provided herein can include a vacuum generated by the expansion of the liquid-containing chamber. In some embodiments, liquid degasification methods and devices provided herein can include a rarefaction process. In some embodiments, liquid degasification methods and devices provided herein can include a mechanical process of separating the removed gas from the liquid from the degassed liquid. In some embodiments, liquid degasification methods and devices can include a combination of a vacuum generated by the expansions of the liquid-containing chamber, a rarefaction process, and a mechanical process of separating the removed gas from the liquid from the degassed liquid. A combination of these three features can achieve a degasification device and method that requires less energy than conventional degasification devices and methods.

In some embodiments, a liquid degasification device or method may include applying a vacuum to the liquid to be degassed by increasing the volume of the liquid chamber. For example, a chamber of a liquid degasification device may be filled with liquid, and then the interior space or volume of the liquid chamber may be increased, resulting in a vacuum in the liquid chamber. This method of applying a vacuum on the liquid can require less energy than conventional methods of applying a vacuum, with typical reductions in energy of more than two orders of magnitude.

In some embodiments, once a vacuum has been applied to the liquid in the chamber, the liquid in the chamber may be treated to encourage gas bubble formation. For example, a movable member of the degasification device may create the conditions that lead to one or more cavitations within the liquid, generating pressure waves in the liquid in the chamber. These pressure waves may accelerate gas bubble formation in the liquid, separating the gas from the liquid. In some embodiments, the movable member is located within the liquid chamber.

Further, because the interior volume of the liquid chamber is variable, once a quantity of gas has emerged from the liquid (i.e., by the generation of vacuum and/or rarefaction, etc.), the volume of the liquid chamber can then be reduced forcing the accumulated gas out of the liquid chamber (e.g., through a one-way valve or a check valve). Reducing the internal volume of the liquid chamber and forcing the removed gas out of the chamber requires less energy than conventional gas separation methods, such as a vacuum pump.

In some embodiments, a method of degasifying a liquid is provided, the method comprising: filling a liquid chamber with a liquid; increasing an internal volume of the liquid chamber to generate a vacuum within the liquid chamber; applying one or more pressure waves to the liquid in the liquid chamber to form a plurality of gas bubbles which rise to the surface of the liquid and release gas within the plurality of gas bubbles into a space above the liquid in the liquid chamber; and decreasing the internal volume of the liquid chamber to force the gas through a vapor outlet of the liquid chamber, wherein a degassed liquid remains in the liquid chamber.

In some embodiments of the method, filling a liquid chamber with liquid comprises completely filling the liquid chamber with liquid to remove all air from the chamber.

In some embodiments of the method, applying one or more pressure waves to the liquid in the liquid chamber comprises moving a carriage within a carriage housing.

In some embodiments of the method, moving a carriage within a carriage housing comprises moving the carriage with a pneumatic piston or a linear electric motor operatively connected to the carriage.

In some embodiments of the method, applying one or more pressure waves to the liquid in the liquid chamber comprises moving a movable member within the liquid chamber with a pressure wave actuator operatively connected to the movable member.

In some embodiments of the method, the pressure wave actuator comprises a pneumatic piston or a piston utilizing a linear electric motor.

In some embodiments of the method, applying one or more pressure waves to the liquid in the liquid chamber comprises projecting sound waves into the liquid.

In some embodiments of the method, increasing an internal volume of the liquid chamber is achieved with a piston.

In some embodiments of the method, decreasing the internal volume of the liquid chamber is achieved with a piston.

In some embodiments of the method, the vapor outlet comprises a one-way valve.

In some embodiments of the method, the method comprises pumping the degassed liquid from the chamber to a receiving tank.

In some embodiments of the method, filling a chamber with a liquid comprises transferring the liquid from a fill tank into the chamber under gravity.

In some embodiments of the method, filling a chamber with a liquid comprises transferring the liquid from a fill tank to the chamber under pressure.

In some embodiments, a degasification device is provided, the degasification device comprising: a liquid chamber; a piston configured to increase and decrease an internal volume of the liquid chamber; a movable member within the liquid chamber; a pressure wave actuator operatively attached to the movable member within the liquid chamber and configured to move the movable member within the liquid chamber to generate pressure waves within a liquid of the liquid chamber that form a plurality of gas bubbles which rise to the surface of the liquid and release gas within the plurality of gas bubbles into a space above the liquid in the liquid chamber; and a vapor outlet configured to allow the release of the gas from the liquid chamber.

In some embodiments of the degasification device, the vapor outlet comprises a one-way valve.

In some embodiments of the degasification device, the piston is configured to increase the internal volume of the liquid chamber and generate a vacuum when the liquid chamber is filled with the liquid.

In some embodiments of the degasification device, the pressure wave actuator is configured to move the movable member when the liquid chamber is under vacuum.

In some embodiments of the degasification device, after the gas within the plurality of gas bubbles has been released into a space above the liquid in the liquid chamber, the piston is configured to decrease the internal volume of the liquid chamber.

In some embodiments of the degasification device, the degasification device comprises a fill tank, wherein the liquid chamber is configured to receive a liquid from the fill tank under gravity.

In some embodiments of the degasification device, the degasification device comprises a fill tank, wherein the liquid chamber is configured to receive a liquid from the fill tank under pressure.

In some embodiments of the degasification device, the degasification device comprises a receiving tank, wherein the receiving tank is configured to receive a degassed liquid from the liquid chamber.

In some embodiments of the degasification device, the piston comprises a pneumatic piston or a linear electric motor.

In some embodiments of the degasification device, the pressure wave actuator comprises a pneumatic piston or a piston utilizing a linear electric motor.

In some embodiments, a degasification device is provided, the degasification device comprising: a liquid chamber; a piston configured to increase and decrease an internal volume of the liquid chamber; a carriage holding the liquid chamber and the piston within a carriage housing; a pressure wave actuator operatively connected to the carriage and configured to move the carriage within the carriage housing to generate pressure waves within a liquid of the liquid chamber that form a plurality of gas bubbles which rise to a surface of the liquid and release gas into a space above the liquid in the liquid chamber; and a vapor outlet configured to allow the release of the gas from the liquid chamber.

In some embodiments of the degasification device, the vapor outlet comprises a one-way valve.

In some embodiments of the degasification device, the piston is configured to increase the internal volume of the liquid chamber and generate a vacuum when the liquid chamber is filled with the liquid.

In some embodiments of the degasification device, the pressure wave actuator is configured to move the carriage within the carriage housing when the liquid chamber is under vacuum.

In some embodiments of the degasification device, after the plurality of gas bubbles has been released into a space above the liquid in the liquid chamber, the piston is configured to decrease the internal volume of the liquid chamber.

In some embodiments of the degasification device, the degasification device comprises a fill tank, wherein the liquid chamber is configured to receive a liquid from the fill tank under gravity.

In some embodiments of the degasification device, the degasification device comprises a fill tank, wherein the liquid chamber is configured to receive a liquid from the fill tank under pressure.

In some embodiments of the degasification device, the degasification device comprises a receiving tank, wherein the receiving tank is configured to receive a degassed liquid from the liquid chamber.

In some embodiments of the degasification device, the piston comprises a pneumatic piston or a piston utilizing a linear electric motor.

In some embodiments of the degasification device, the pressure wave actuator comprises a pneumatic piston or a linear electric motor.

In some embodiments, a degasification device is provided, the degasification device comprising: a liquid chamber; a piston configured to increase and decrease an internal volume of the liquid chamber; a sound wave actuator operatively attached to the liquid chamber configured to project sound waves into a liquid in the liquid chamber to form a plurality of gas bubbles which rise to a surface of the liquid and release gas within the plurality of gas bubbles into a space above the liquid in the liquid chamber; and a vapor outlet configured to allow the release of the gas from the liquid chamber.

In some embodiments of the degasification device, the vapor outlet comprises a one-way valve.

In some embodiments of the degasification device, the piston is configured to increase the internal volume of the liquid chamber and generate a vacuum when the liquid chamber is filled with the liquid.

In some embodiments of the degasification device, the sound wave actuator is configured to project sound waves into the liquid chamber when the liquid chamber is under vacuum.

In some embodiments of the degasification device, after the gas within the plurality of gas bubbles has been released into a space above the liquid in the liquid chamber, the piston is configured to decrease the internal volume of the liquid chamber.

In some embodiments of the degasification device, the degasification device comprises a fill tank, wherein the liquid chamber is configured to receive a liquid from the fill tank under gravity.

In some embodiments of the degasification device, the degasification device comprises a fill tank, wherein the liquid chamber is configured to receive a liquid from the fill tank under pressure.

In some embodiments of the degasification device, the degasification device comprises a receiving tank, wherein the receiving tank is configured to receive a degassed liquid from the liquid chamber.

In some embodiments of the degasification device, the piston comprises a pneumatic piston or a piston utilizing a linear electric motor.

In some embodiments, any one or more of the features, characteristics, or elements discussed above with respect to any of the embodiments may be incorporated into any of the other embodiments mentioned above or described elsewhere herein.

DETAILED DESCRIPTION OF THE DISCLOSURE

Figure 1:
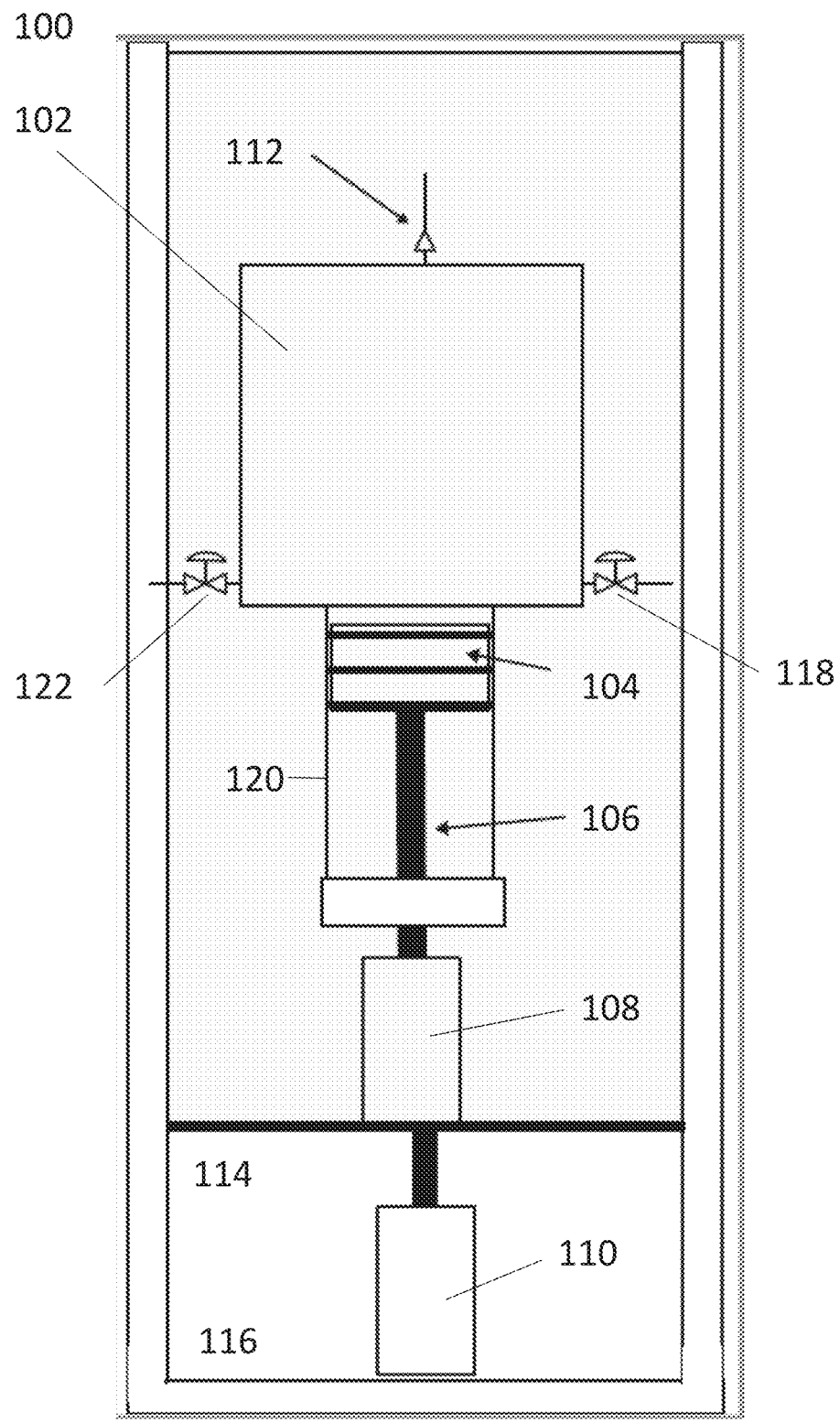
FIG. 1 shows a degasification device having a variable volume liquid chamber and a movable member to generate cavitation events, according to some embodiments.

Described herein are low energy degasification devices and methods of degassing liquids using minimal amounts of energy. Degasification devices and methods of degassing liquids described may be applied to industries that require degassed liquids, such as those including chemical synthesis, boiler systems, and entrochemical systems. The devices and methods for degasification of liquids do not include the application of heat, the use of a vacuum pump, or the use of complex materials.

Degasification devices and methods of degassing described herein can include a liquid chamber with a variable volume. The variable volume of the liquid chamber may be utilized together with the liquid therein to generate an internal vacuum. The amount of dissolved gas in a liquid is proportional to its partial pressure (i.e., according to Henry's Law). Thus, placing the liquid under reduced pressure makes the dissolved gas less soluble. The devices and methods provided herein can reduce the pressure within the liquid chamber in a way that requires less energy than that of conventional degasification devices and methods. For example, the liquid chamber may be first filled with liquid, and then, after sealing the filled liquid chamber, the volume of the chamber may be expanded, reducing the pressure in the chamber. In some embodiments, the liquid chamber may be filled completely such that no undissolved air remains in the liquid chamber. In such cases the space in the liquid chamber above the liquid once the chamber has been expanded is largely filled with vapor from the evaporating liquid. In some embodiments, a piston may be used to increase and decrease the internal volume of the liquid chamber.

Degasification devices and methods described herein can also include subjecting the liquid in the liquid chamber to pressure waves, which encourage the rapid generation of air bubbles. For example, a degasification device may include a component configured to generate one or more cavitation events in the liquid chamber. The resulting pressure waves moving through the liquid in the liquid chamber promote the rapid emergence of gas bubbles in the liquid. In some embodiments, a degasification device may include an internal component within the liquid chamber. The internal component can be a movable member. The internal component and/or movable member may be operatively connected to a pressure wave actuator that is configured to move the internal component to generate pressure waves, which encourage the rapid generation of air bubbles in the liquid of the liquid chamber. In some embodiments, the liquid chamber may be held by a carriage within a carriage housing. The carriage may be configured to move within the carriage housing. A carriage actuator may be operatively connected to the carriage and configured to rapidly move the carriage within the carriage housing. This rapid movement may generate cavitation events within the liquid in the chamber, leading to the formation of a plurality of gas bubbles in the liquid.

Once the gas bubbles have formed in the liquid they can be separated from the liquid to prevent reabsorption. In the reduced pressure environment created by the expansion of the liquid chamber, the bubbles rise to the top of the liquid and leave the liquid, releasing the air into the space above the liquid. In some embodiments, degasification devices and methods may include decreasing the internal volume of the liquid chamber. Decreasing the internal volume of the liquid chamber can compress the gas and force it towards the top of the liquid chamber, where a vapor outlet is positioned. The vapor outlet, which may comprise a one-way valve or a check valve, can be used to remove the gas from the liquid chamber.

In some embodiments, a degasification device may include a fill tank and/or a receiving tank. Each of the fill tank and/or the receiving tank may be in fluid communication with the liquid chamber.

The degasification devices and methods described may be used to degas liquids including, but not limited to, water, solvents, or solutions.

Described below are (1) degasification devices comprising adjustable internal volume, an agitation component for generating a plurality of gas bubbles and a separation mechanism for removing the gas of the plurality of gas bubbles from the liquid chamber, and (2) methods for degasifying liquids.

Degasification Devices

Degasification devices according to embodiments provided herein can remove dissolved gas from a liquid using lower amounts of energy than that of conventional degasification devices. For example, degasification devices described herein do not apply heat to the liquid to remove the dissolved gas within the liquid. In some embodiments, degasification devices as described do not use heat at all to remove gas, or degasify, the liquid.

A degasification device can include three main features, or components-a liquid chamber having a variable, or adjustable, internal volume, a component that applies pressure waves to the liquid to remove dissolved air from the liquid by encouraging the rapid formation of gas bubbles, and a vapor removal or separation feature for removing the gas of the gas bubbles from the liquid chamber. The liquid remaining in the liquid chamber after removing the gas of the gas bubbles from the chamber comprises a lower amount of dissolved gas than the liquid prior to degasification. Each of these three features is described in detail below with reference to FIGS. 1-4.

FIG. 1 shows a degasification device 100 having a variable volume liquid chamber and a movable member to generate cavitation events, according to some embodiments. As shown, degasification device 100 includes a main chamber 102 having a liquid inlet 118, a liquid outlet 122, and vapor outlet 112, piston 104 in a piston housing 120, actuator 108 with actuating rod 106 for actuating piston 104, carriage 114 within carriage housing 116, and carriage actuator 110.

Main chamber 102 includes a liquid inlet 118 and a liquid outlet 122. In some embodiments, main chamber 102 is configured to receive a liquid to be degassed through liquid inlet 118. In some embodiments, once the liquid to be degassed has been degassed, main chamber 102 is configured to evacuate the degassed liquid through liquid outlet 122. Main chamber 102 also includes vapor outlet 112. Vapor outlet 112 is configured to release gas removed from the liquid to be degassed from main chamber 102. In some embodiments, vapor outlet 112 may comprise a one-way or check valve. Vapor outlet 112 may be located at a top surface of main chamber 102.

The liquid chamber of device 100 is configured to have a variable, or adjustable, internal volume. For example, when the liquid chamber is at its minimum internal volume, the liquid chamber comprises only main chamber 102. When the liquid chamber is at its maximum internal volume, it comprises main chamber 102 and piston housing 120 (when piston 104 is in a completely open position). The volume of the liquid chamber is increased or decreased by sliding piston 104 within piston housing 120. For example, when piston 104 slides away from liquid chamber 102 to increase the internal volume of liquid chamber 102, it exposes space within piston housing 120. This exposed internal space of piston housing 120 is contiguous with the internal space of the liquid chamber 102. Thus, as piston 104 slides away from liquid chamber 102 to expose more internal space of piston housing 120, the liquid chamber expands to include the volume of piston housing 120. This action of increasing the volume to include the increased internal volume (i.e., the internal volume of main chamber 102 and the internal volume of piston housing 120 provided by moving piston 104 away from main chamber 102) can generate a vacuum within the liquid chamber. The resultant vacuum will have a pressure greater than or equal to the partial pressure of the enclosed liquid, with the difference from the theoretical partial pressure being the result of air emerging from the liquid. Actuator 108 and actuating rod 106 are configured to move piston 104. Actuator 108 may comprise a pneumatic cylinder, a linear motor, or any other suitable mechanism for actuating rod 106.

To rapidly remove dissolved gas from the liquid to be degassed, the liquid must be agitated. In some embodiments, a cavitation event or events may be created within the liquid, generating pressure waves, and/or pressure waves may be applied directly to the liquid to be degassed. For example, carriage 114, carriage housing 116, and carriage actuator 110 may be configured to agitate the liquid to be degassed when it is in liquid chamber 102. Carriage housing 116 may be a stationery framework configured to support carriage 114. For example, carriage 114 may hold liquid chamber 102, and be configured to move rapidly back and forth or up and down within carriage housing 116. Carriage actuator 110 may be operatively connected to carriage 114 and configured to move carriage 114 within carriage housing 116. Carriage actuator 110 may comprise a pneumatic piston, a linear electric motor, or any other actuating device configured for rapid movement.

Figure 2:
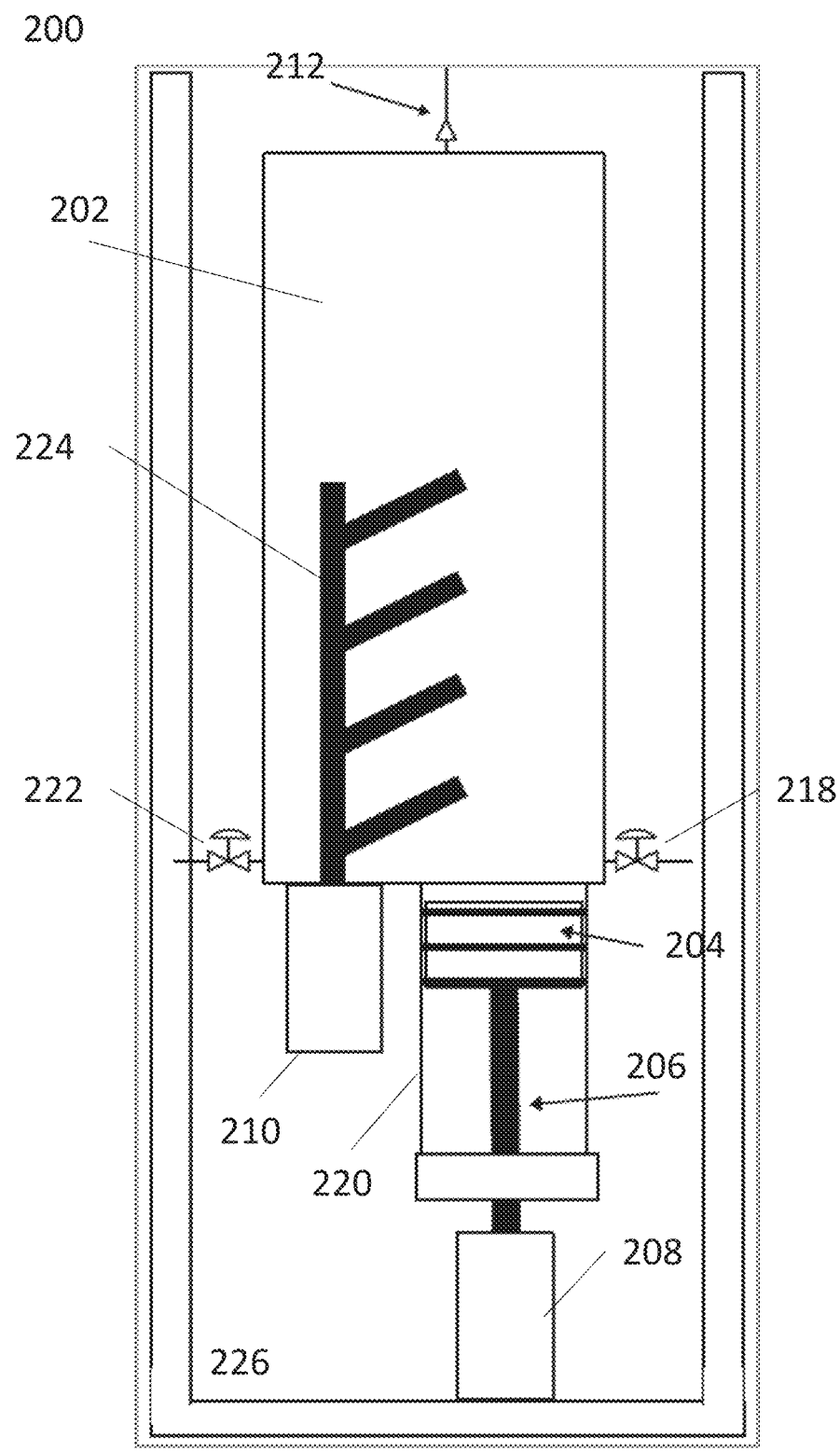
FIG. 2 shows a degasification device having a variable volume liquid chamber, and a movable member to generate pressure waves, according to some embodiments.

FIG. 2 shows a degasification device 200 having a variable volume liquid chamber, and a movable member to generate pressure waves or cavitation events, according to some embodiments. Degasification device 200 includes a liquid chamber comprising main chamber 202 and optionally part of piston housing 220 (depending on the position of piston 204). Main chamber 202 includes a liquid inlet 218, a liquid outlet 222, and vapor outlet 212, piston 204 in a piston housing 220, actuator 208 with actuating rod 206 for actuating piston 204, movable member 224 within liquid chamber 202, actuator 210 for actuating movable member 224, and framework 226 for housing device 200.

Main chamber 202 comprises a liquid inlet 218, a liquid outlet 222, and a vapor outlet 212. Liquid inlet 218, liquid outlet 222, and vapor outlet 212 may comprise any features of liquid inlet 118, liquid outlet 122, and vapor outlet 112 as described with reference to device 100 of FIG. 1.

The liquid chamber is designed to have a variable (or adjustable) internal volume. Thus, the liquid chamber comprises main chamber 202 and in some embodiments, a portion of piston housing 220 as well. In some embodiments, the liquid chamber may comprise main chamber 202. For example, when liquid to be degassed is transferred into the liquid chamber, liquid chamber may comprise only main chamber 202. Once the liquid to be degassed has been completely transferred into main chamber 202, piston 204 may open by sliding away from main chamber 202. As piston 204 slides away from main chamber 202, the volume of the total liquid chamber increases, because a portion of the internal volume of piston housing 220 vacates, allowing liquid to flow into the portion of piston housing 220 that is between the head of piston 204 and main chamber 202. Increasing the internal volume of the liquid chamber generates a vacuum within the liquid chamber. In some embodiments, piston 204 may also be configured to decrease the internal volume of the liquid chamber. For example, piston 204 may close, or slide towards main chamber 202.

Piston 204, piston housing 220, actuator 208, and actuating rod 206 may include any features of piston 104, piston housing 120, actuator 108, and actuating rod 106, respectively, as described above with respect to device 100 of FIG. 1.

Degasification device 200 includes movable member 224 positioned within main chamber 202. Movable member 224 is configured to rapidly move within main chamber 202 (e.g., side to side or up and down, to rotate, to rock side to side) to cavitate the liquid to be degassed within the liquid chamber. In some embodiments, movable member 224 is configured to apply pressure waves to the liquid to be degassed in the liquid chamber. The rapid movement of movable member 224 can generate pressure waves that encourage the rapid formation of gas bubbles comprising gas that was dissolved within the liquid to be degassed. In some embodiments, once movable member 224 has stopped its rapid motion, the gas bubbles are allowed to migrate towards the top of the liquid chamber and emerge into the space above the liquid.

Actuator 210 is operatively connected to movable member 224 and is configured to rapidly move movable member 224. Actuator 210 may comprise a pneumatic piston, a linear electric motor, or any other actuating device configured for rapid movement.

Device 200 may include a framework 226 or housing for structural support.

Figure 3:
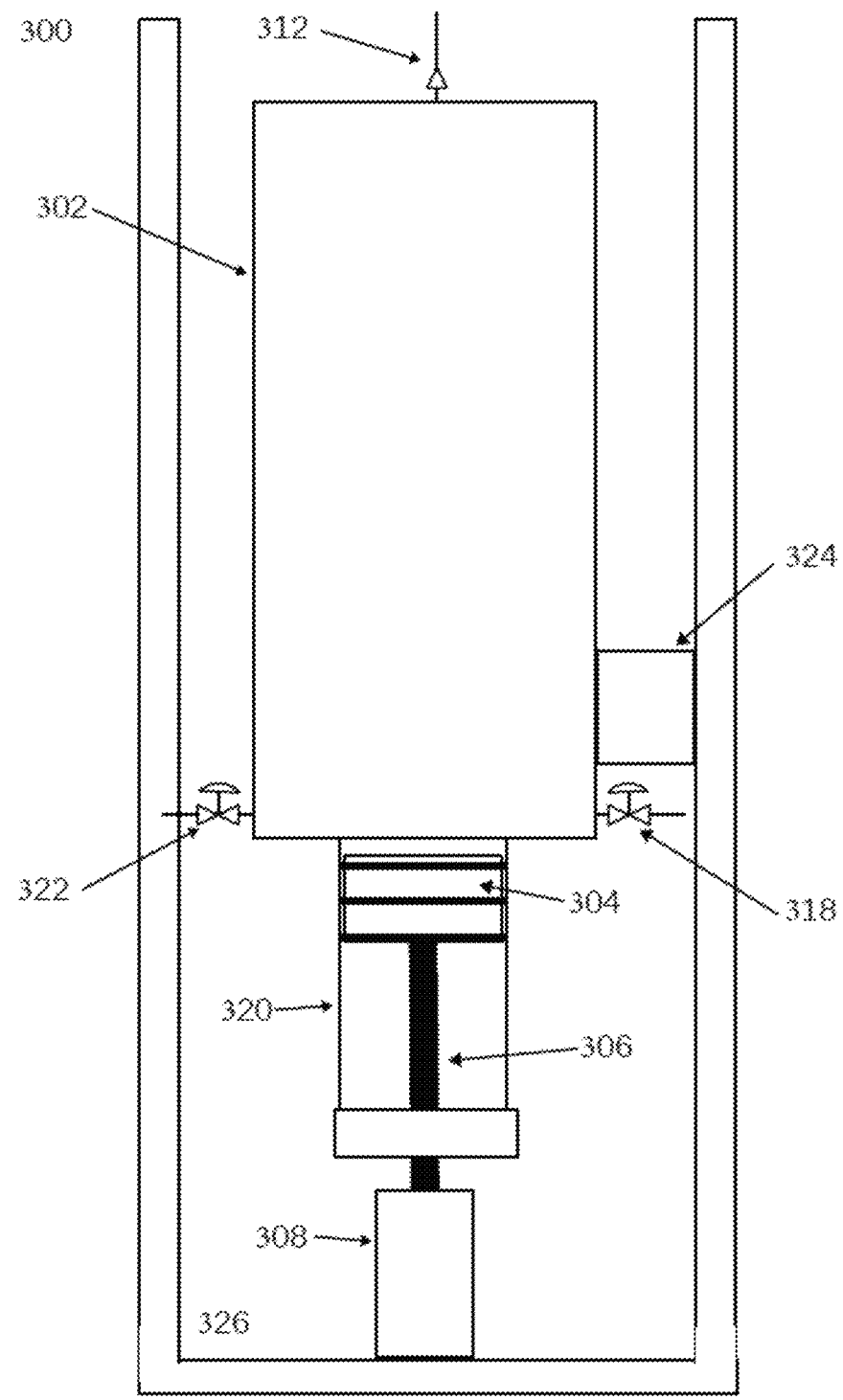
FIG. 3 shows a degasification device having a variable volume liquid chamber and external actuator to generate sound waves, according to some embodiments

FIG. 3 shows a degasification device 300 having a variable volume liquid chamber and external actuator 324 to generate sound waves, according to some embodiments. Degasification device 300 includes a liquid chamber comprising main chamber 302 and optionally part of piston housing 320 (depending on the position of piston 304). Main chamber 302 includes a liquid inlet 318, a liquid outlet 322, and vapor outlet 312, piston 304 in a piston housing 320, actuator 308 with actuating rod 306 for actuating piston 304 and framework 326 for housing device 300.

Main chamber 302 comprises a liquid inlet 318, a liquid outlet 322, and a vapor outlet 312. Liquid inlet 318, liquid outlet 322, and vapor outlet 312 may comprise any features of liquid inlet 118, liquid outlet 122, and vapor outlet 112 as described with reference to device 100 of FIG. 1. Liquid inlet 318, liquid outlet 322, and vapor outlet 312 may comprise any features of liquid inlet 218, liquid outlet 222, and vapor outlet 212 as described with reference to device 200 of FIG. 2.

The liquid chamber is designed to have a variable (or adjustable) internal volume. Thus, the liquid chamber comprises main chamber 302 and in some embodiments, a portion of piston housing 320 as well. In some embodiments, the liquid chamber may comprise main chamber 302. For example, when liquid to be degassed is transferred into the liquid chamber, liquid chamber may comprise only main chamber 302. Once the liquid to be degassed has been completely transferred into main chamber 302, piston 304 may open by sliding away from main chamber 302. As piston 304 slides away from main chamber 302, the volume of the total liquid chamber increases, because a portion of the internal volume of piston housing 320 vacates, allowing liquid to flow into the portion of piston housing 320 that is between the head of piston 304 and main chamber 302. Increasing the internal volume of the liquid chamber generates a vacuum within the liquid chamber. In some embodiments, piston 304 may also be configured to decrease the internal volume of the liquid chamber. For example, piston 304 may close, or slide towards main chamber 302.

Piston 304, piston housing 320, actuator 308, and actuating rod 306 may include any features of piston 104, piston housing 120, actuator 108, and actuating rod 106, respectively, as described above with respect to device 100 of FIG. 1. Piston 304, piston housing 320, actuator 308, and actuating rod 306 may include any features of piston 204, piston housing 220, actuator 208, and actuating rod 206, respectively, as described above with respect to device 200 of FIG. 2.

Degasification device 300 includes external actuator 324 positioned outside main chamber 302. External actuator 324 is configured to generate a sound wave which penetrates main chamber 302 to impart sound waves to the liquid to be degassed within the liquid chamber. The sound waves, which are themselves pressure waves, encourage the rapid formation of gas bubbles comprising gas that was dissolved within the liquid to be degassed. In some embodiments, once the sound has been stopped, the gas bubbles are allowed to migrate towards the top of the liquid chamber and emerge into the space above the liquid.

External actuator 324 may comprise a speaker or a reciprocating transducer.

Device 300 may include a framework 326 or housing for structural support.

Figure 4:
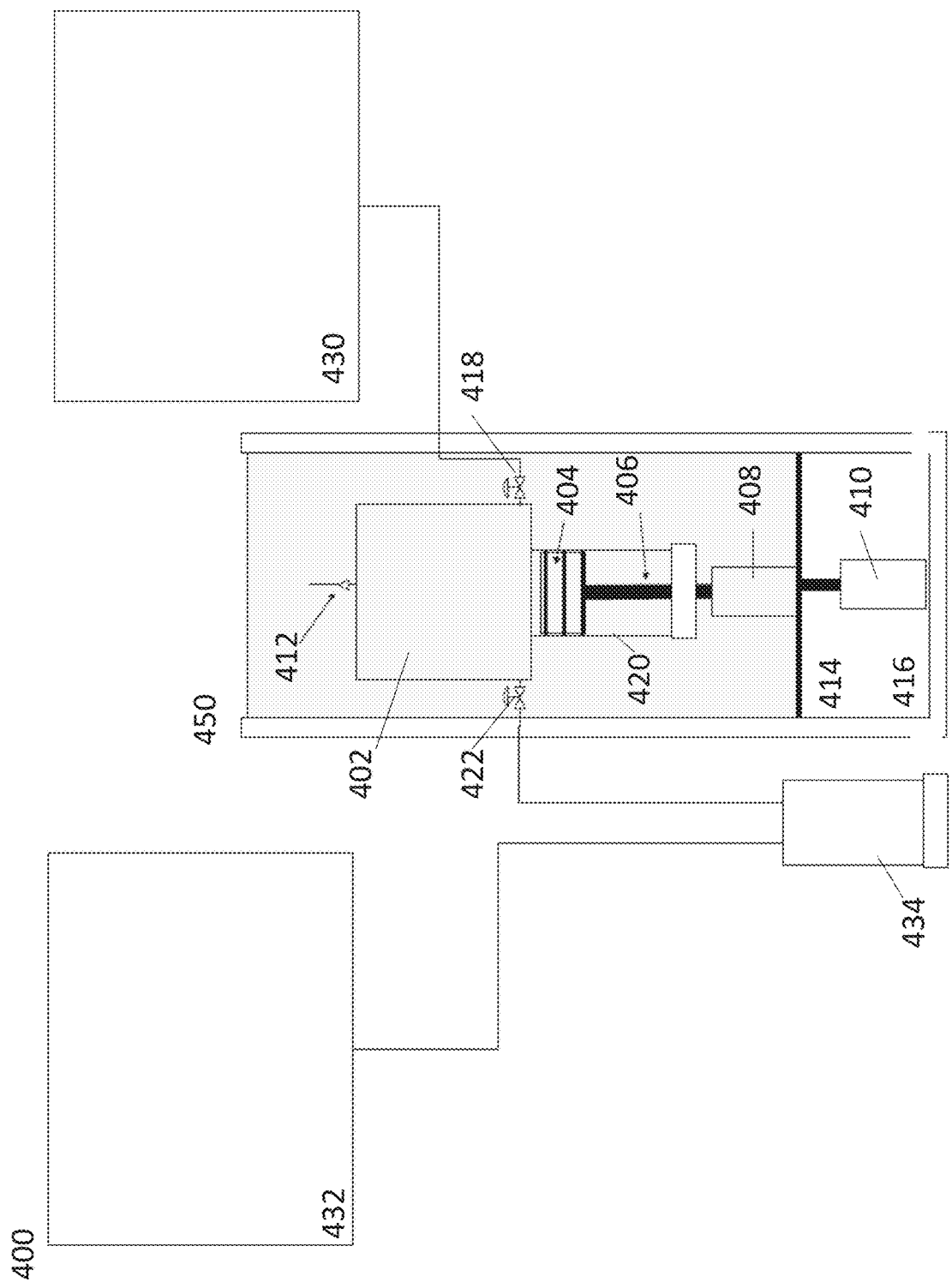
FIG. 4 shows a degasification device connected to an input tank, an output tank, and pump for the movement of degassed liquid, according to some embodiments.

FIG. 4 shows a system 400 that includes degasification device 450 in fluid connection with a fill tank 430, a receiving tank 432, and pump 434 for the movement of degassed liquid, according to some embodiments.

Degasification device 450 includes main chamber 402, fluid inlet 418, fluid inlet 412, piston 404, piston housing 420, actuator 408, actuating rod 406, carriage 414, carriage housing 410, and carriage actuator 410. Degasification device 450 may include any features of degasification device 100 as described with respect to FIG. 1, degasification device 200 as described with respect to FIG. 2 and/or degasification device 300 as described with respect to FIG. 3. The components of degasification device 450 (e.g., main chamber 402, vapor outlet 412, fluid inlet 418, fluid inlet 422, piston 404) can include any features of their respective corresponding component as described with respect to degasification device 100 of FIG. 1, degasification device 200 of FIG. 2, and/or degasification device 300 of FIG. 3. Although degasification device 450 is shown with a carriage 414, carriage housing 416, and carriage actuator 410, degasification device 450 may alternatively include a movable member within main chamber 402, an actuator operatively connected to the movable member, as described with respect to movable member 224 and actuator 210 of FIG. 2, and/or an external actuator connected to the main chamber, as described with respect to external actuator 324 of FIG. 3.

Fill tank 430 and receiving tank 432 are fluidly connected to degasification device 450. In some embodiments, main chamber 402 is configured to receive liquid to be degassed from fill tank 430. Liquid to be degassed may be transferred from fill tank 430 to main chamber 402 of degasification device 450 under gravity (i.e., in which fill tank 430 is positioned higher than degasification device 450 such that liquid can flow from fill tank 430 to degasification device 450 only with the aid of gravity). In some embodiments, liquid to be degassed may be transferred from fill tank 430 to main chamber 402 of degasification device 450 under pressure.

Receiving tank 432 is configured to receive degassed liquid from main chamber 402 of degasification device 450. In some embodiments, pump 434 is configured to pump liquid from main chamber 402 to receiving tank 432. In some embodiments, pump 434 is configured to pump degassed liquid from main chamber when the degassed liquid of main chamber 402 is still under vacuum.

Methods of Degassing a Liquid

Figure 5:
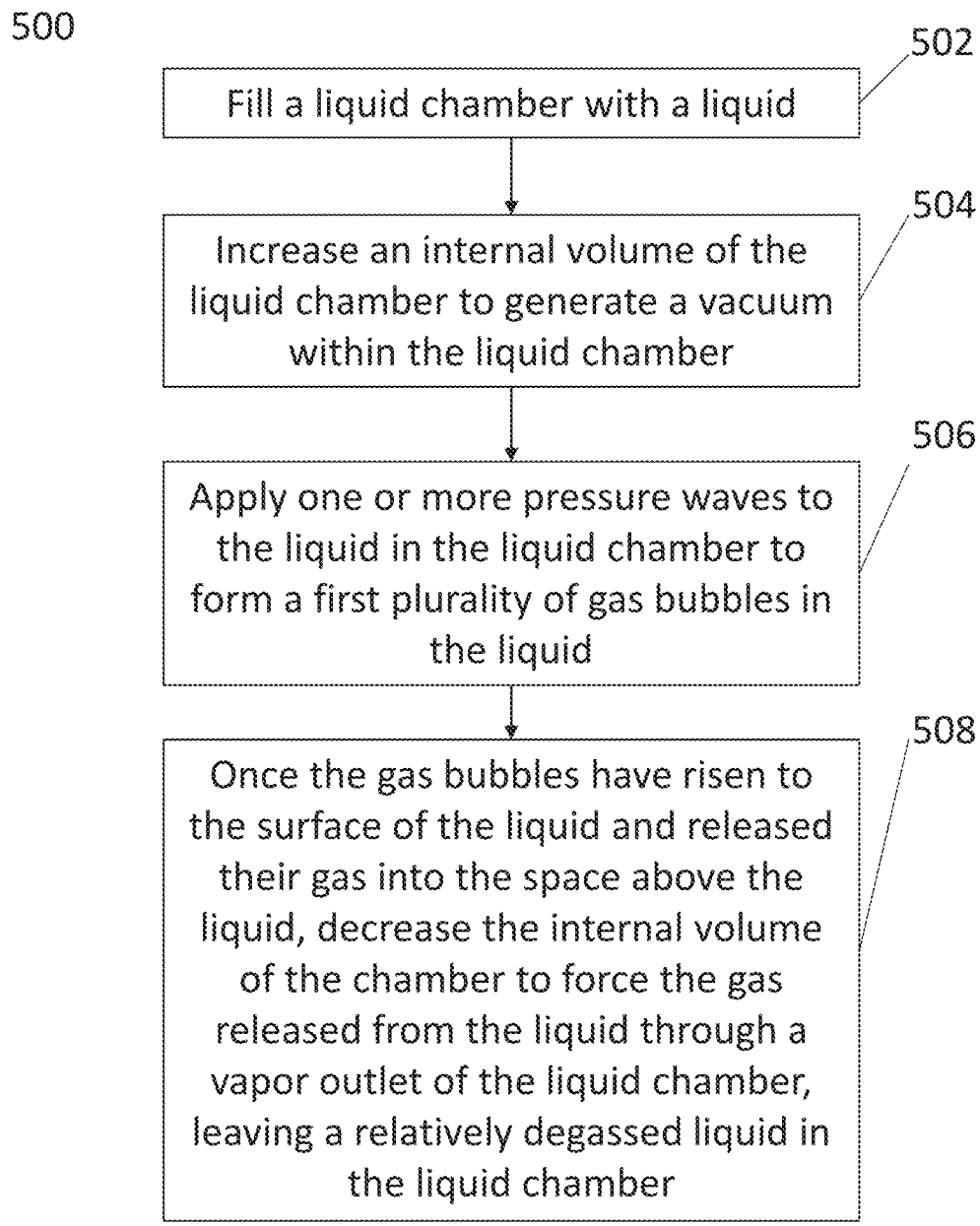
FIG. 5 shows a method of degassing a liquid, according to some embodiments.

Methods of degassing a liquid may include using one of the degasification devices described above. FIG. 5 shows a method 500 of degassing a liquid, according to some embodiments.

At step 502 of method 500, a liquid chamber is filled with a liquid to be degassed. Liquid chamber may include a main liquid chamber (e.g., main chamber 102 of FIG. 1, main chamber 202 of FIG. 2, main chamber 302 of FIG. 3, main chamber 402 of FIG. 4) of a degasification device. In some embodiments, the liquid chamber may be completely filled with liquid such that no air remains in the liquid chamber. In some embodiments, the liquid chamber may be hermetically sealed after being filled with liquid.

At step 504, the internal volume of the liquid chamber increases to generate a vacuum within the liquid chamber. For example, the volume may be increased with the use of a piston (e.g., piston 108 of FIG. 1, piston 208 of FIG. 2, piston 308 of FIG. 3, piston 408 of FIG. 4). Conventional degasification methods generally generate a vacuum by reducing the pressure in a chamber that is partially full of liquid. However, this can require more energy than that which is required by the presently disclosed methods which include a cycle of filling and expanding (i.e., increasing the internal volume) of a liquid chamber. For example, reducing the pressure in a two liter chamber with one liter of head space above a liter of water might take a vacuum pump take 30 seconds to reduce the pressure to the partial pressure of the water inside. If the pump requires 600 W to run, the total expenditure would be 18,000 J. On the other hand, if a one liter cavity was completely filled with water initially and then expanded to two liters once sealed, the energy required would be 101.325 J. This represents a reduction in required energy of 99.44%.

At step 506, pressure waves are applied to the liquid in the liquid chamber. Applying pressure waves to the liquid can increasing the speed of degasification of the liquid. For example, it is well understood that simply putting the liquid in an evacuated chamber in which the low pressure is maintained will eventually generate a degassed liquid. Yet the process involves relatively slow transport of gas out of the liquid. However, applying pressure waves to the liquid while the liquid is maintained at low pressure can accelerate the generation of gas bubbles in the liquid. The specific process by which this occurs is called rarefaction. During this process, the pressure waves encourage the nucleation, or initial creation and growth, of bubbles. These bubbles acquire air from the liquid bulk and then, due to their lower density, travel upward in the liquid and exit the liquid at the top. Once the air enters a bubble, it is unlikely to move back into the liquid. Therefore, by helping to generate the bubbles, the methods of generating the pressure waves virtually guarantee that the air will more rapidly leave the liquid.

When cavitation occurs within the liquid, it generates very sharp pressure waves that propagate through the liquid encouraging the formation of gas bubbles within the liquid. In some embodiments, the cavitation events may result from rapidly moving the liquid chamber back-and-forth or up-and-down. In some embodiments, the cavitation may be generated with a movable carriage in a carriage housing (e.g., carriage 114 and carriage housing 116 of FIG. 1). In other embodiments pressure waves may be imparted with a movable member within the liquid chamber (e.g., movable member 224 of FIG. 2).

At step 508, the internal volume of the liquid chamber is decreased and the air which fills the space above the liquid is forced through a vapor outlet (e.g., vapor outlet 112 of FIG. 1, vapor outlet 212 of FIG. 2, vapor outlet 312 of FIG. 3, vapor outlet 412 of FIG. 3) and out of the liquid chamber. This is to separate the removed gas from the liquid to prevent reabsorption and to enable the subsequent regeneration of a stronger vacuum. Steps 502-508 may be repeated as necessary, until a suitably degassed liquid remains.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

For any of the structural and functional characteristics described herein, methods of determining these characteristics are known in the art.

The invention claimed is:

1. A method of degasifying a liquid comprising:
filling a liquid chamber with liquid;
increasing an internal volume of the liquid chamber to generate a vacuum within the liquid chamber;
applying one or more pressure waves to the liquid in the liquid chamber to form a plurality of gas bubbles which rise to a surface of the liquid and release gas within the plurality of gas bubbles into a space above the liquid in the liquid chamber; and
decreasing the internal volume of the liquid chamber to force the gas through a vapor outlet of the liquid chamber, wherein a degassed liquid remains in the liquid chamber.

2. The method of claim 1, further comprising: closing the liquid chamber prior to increasing the internal volume of the liquid chamber.

3. The method of claim 1, wherein filling the liquid chamber with the liquid comprises completely filling the liquid chamber with the liquid to remove all air from the chamber.

4. The method of claim 1, wherein applying the one or more pressure waves to the liquid in the liquid chamber comprises moving a carriage within a carriage housing.

5. The method of claim 4, wherein moving the carriage within the carriage housing comprises moving the carriage with a pneumatic piston or a linear electric motor operatively connected to the carriage.

6. The method of claim 4, wherein moving the carriage within the carriage housing creates cavitation events within the liquid to generate the one or more pressure waves.

7. The method of claim 1, wherein applying the one or more pressure waves to the liquid in the liquid chamber comprises moving a movable member within the liquid chamber with a pressure wave actuator operatively connected to the movable member.

8. The method of claim 7, wherein the pressure wave actuator comprises a pneumatic piston or a linear electric motor.

9. The method of claim 1, wherein applying the one or more pressure waves to the liquid in the liquid chamber comprises projecting sound waves into the liquid.

10. The method of claim 9, wherein projecting the sound waves into the liquid comprises generating the sound waves using an external actuator positioned outside of the liquid chamber.

11. The method of claim 10, wherein the external actuator comprises a speaker or a reciprocating transducer.

12. The method of claim 1, wherein increasing the internal volume of the liquid chamber is achieved with a piston.

13. The method of claim 1, wherein decreasing the internal volume of the liquid chamber is achieved with a piston.

14. The method of claim 1, wherein the vapor outlet comprises a one-way valve.

15. The method of claim 1, further comprising: pumping the degassed liquid from the liquid chamber to a receiving tank.

16. The method of claim 1, wherein filling the liquid chamber with the liquid comprises transferring the liquid from a fill tank into the liquid chamber under gravity.

17. The method of claim 1, wherein filling the liquid chamber with the liquid comprises transferring the liquid from a fill tank to the chamber under pressure.

18. The method of claim 1, further comprising: after forcing the gas through the vapor outlet of the liquid chamber, regenerating the vacuum within the liquid chamber.

* * * * *